(12) United States Patent
Rainbolt et al.

(10) Patent No.: US 7,123,672 B2
(45) Date of Patent: Oct. 17, 2006

(54) METHOD AND APPARATUS FOR FACILITATING EFFICIENT DEINTERLEAVING AND DIVERSITY-COMBINING OF A DATA SIGNAL

(75) Inventors: Bradley J. Rainbolt, Sunrise, FL (US); Stephen R. Carsello, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 130 days.

(21) Appl. No.: 10/426,488

(22) Filed: Apr. 30, 2003

(65) Prior Publication Data

US 2004/0218685 A1    Nov. 4, 2004

(51) Int. Cl.
  *H04B 7/10* (2006.01)
(52) U.S. Cl. ...................................... 375/347; 714/788

(58) Field of Classification Search ................ 375/346, 375/347, 348, 240.27; 714/761, 762, 787, 714/788, 756
See application file for complete search history.

(56) References Cited

U.S. PATENT DOCUMENTS 6,721,908 B1 * 4/2004 Kim et al. .................. 714/702

* cited by examiner

*Primary Examiner*—Kevin Kim

(57) ABSTRACT

A processor (604) determines (502) a channel metric from a data signal received on a diversity branch. The processor calculates (504) an index into a final metrics buffer (702), the index determined from a position of the channel metric within an interleaved frame of data. The processor places (506) a value derived from the channel metric into the final metrics buffer at a location defined by the index. A corresponding method and apparatus as well as communications receiver utilizing the processor (604) are described.

16 Claims, 4 Drawing Sheets

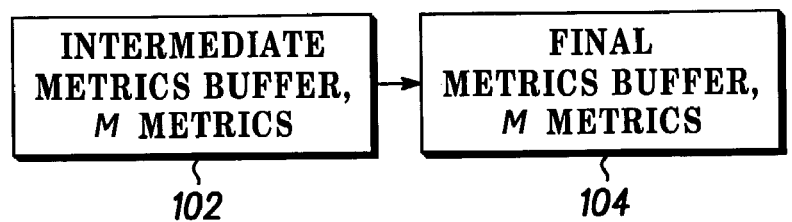
FIG. 1 - PRIOR ART -
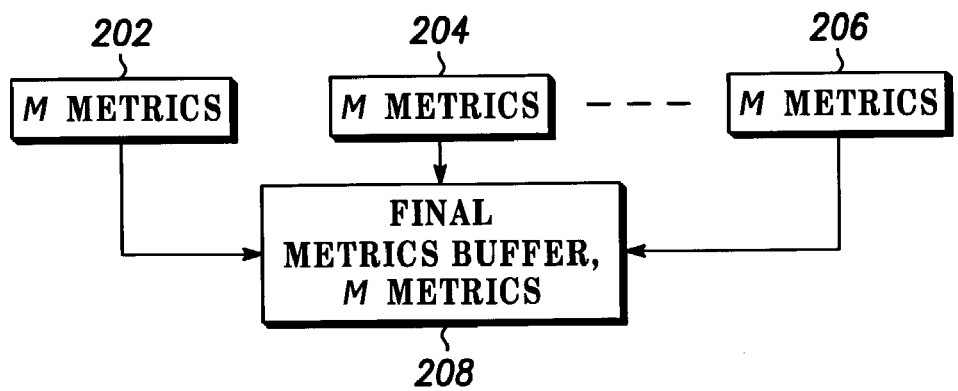
FIG. 2 - PRIOR ART -
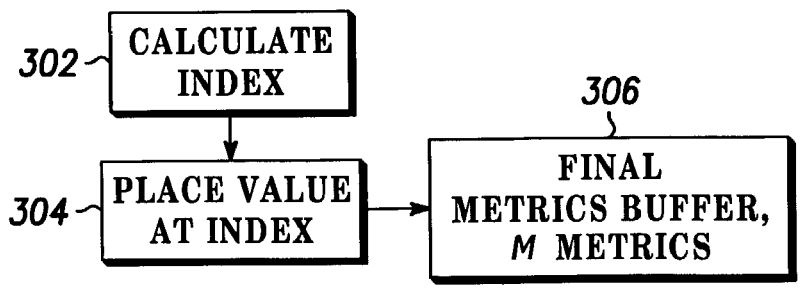
FIG. 3

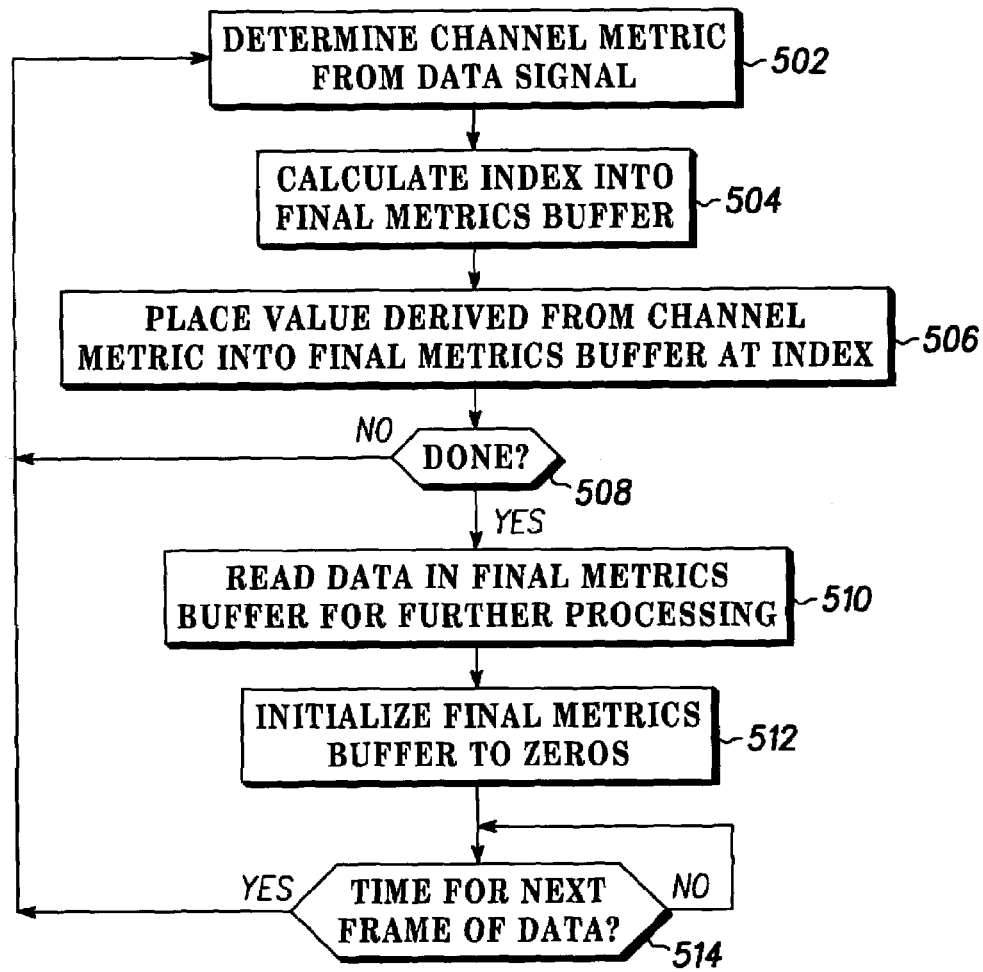
500  FIG. 5
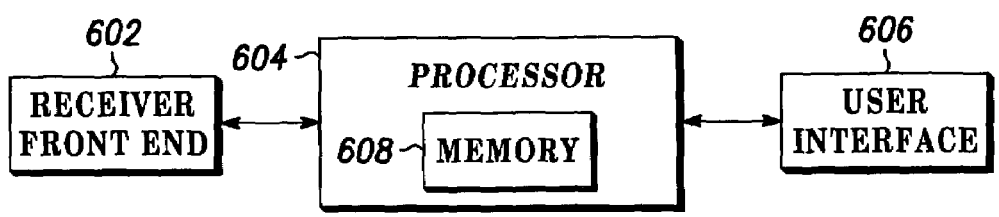
600  FIG. 6

METHOD AND APPARATUS FOR FACILITATING EFFICIENT DEINTERLEAVING AND DIVERSITY-COMBINING OF A DATA SIGNAL

FIELD OF THE INVENTION

This invention relates in general to data communication systems, and more specifically to a method and apparatus for facilitating efficient deinterleaving and diversity-combining of a data signal.

BACKGROUND OF THE INVENTION

In a communication system that uses time interleaving and a form of repeat diversity such as frequency diversity, the receiver must collect channel metrics and perform deinterleaving and diversity combining. A prior-art method of doing this has required a buffer for the storage of all channel metrics, in addition to a buffer for the final metrics, those that have been deinterleaved and combined. The prior-art method utilizes memory inefficiently, because ultimately only the final metrics will be used in the demodulation and decoding, and the stored channel metrics will be discarded. The buffer of channel metrics is at least as large as the buffer of final metrics, and in most cases, much larger.

Thus, what is needed is a method and apparatus for facilitating an efficient deinterleaving and diversity-combining of a data signal. The method and apparatus preferably will substantially reduce the memory resources required to perform the deinterleaving and combining.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages of the present invention.

FIG. 1 is a diagram depicting a prior-art technique for buffering channel metrics in a system employing interleaving.

FIG. 2 is a diagram depicting a prior-art technique for buffering channel metrics in a system employing repeat diversity.

FIG. 3 is an exemplary diagram depicting a technique for buffering channel metrics in accordance with the present invention in a system employing at least one of interleaving and repeat diversity.

FIG. 5 is an exemplary flow diagram depicting a technique for deinterleaving and diversity combining in accordance with the present invention.

FIG. 6 is an exemplary electrical block diagram of a communication receiver in accordance with the present invention.

DETAILED DESCRIPTION OF THE PREFERRED EMBODIMENTS

Figure 4:
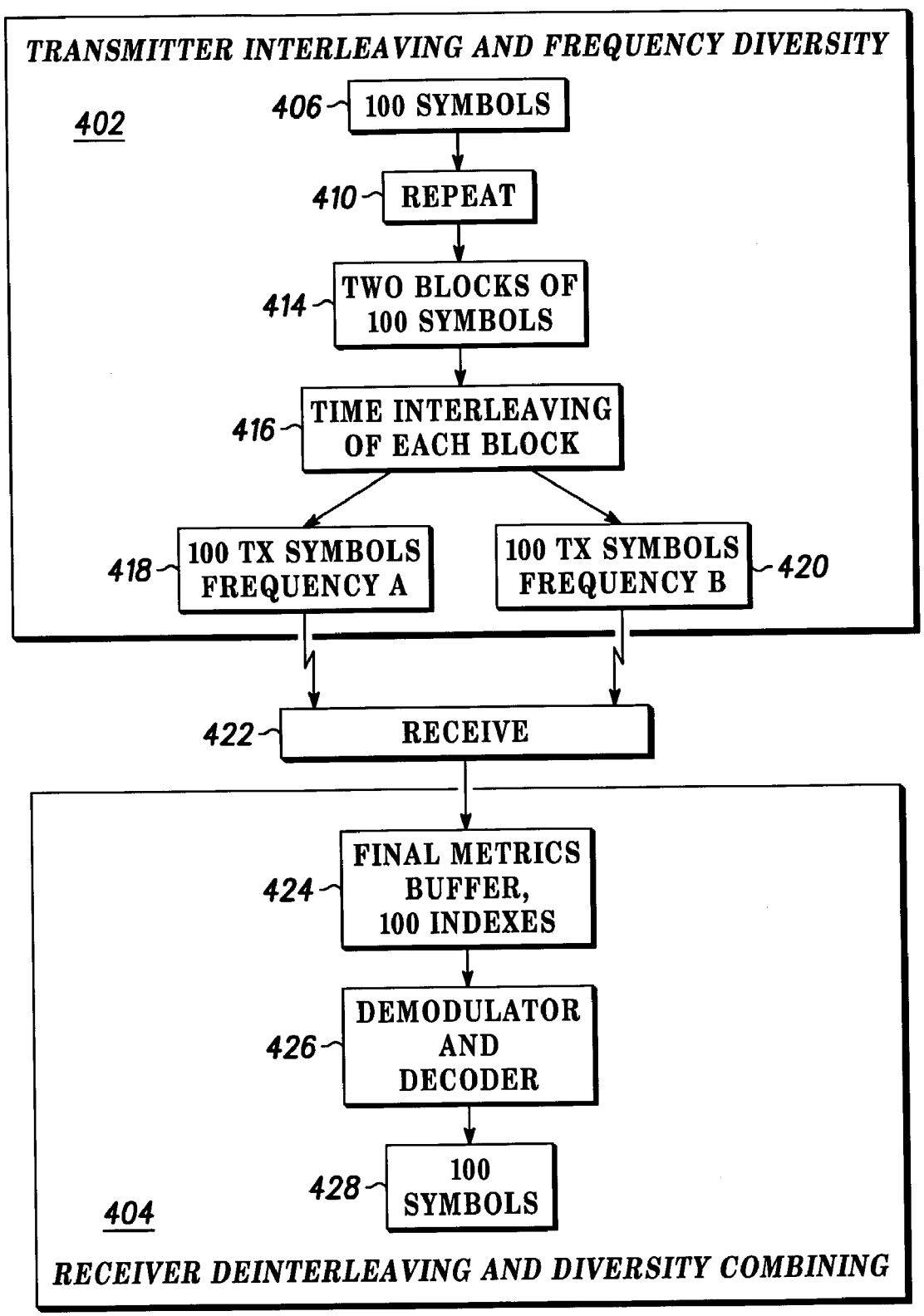
FIG. 4 is an exemplary diagram depicting transmitter interleaving and frequency diversity, and receiver deinterleaving and diversity combining, in accordance with the present invention.

In overview, the present disclosure concerns communications systems that utilize receivers to provide service for communications units or more specifically users thereof operating therein. More particularly, various inventive concepts and principles embodied as a method and apparatus for facilitating efficient deinterleaving and diversity-combining of a data signal for use in equipment with such communications systems will be discussed and disclosed. The communications systems of particular interest are those being deployed and developed such as the Integrated Dispatch Enhanced Network systems and evolutions thereof that utilize interleaving and repeat diversity, although the concepts and principles have application in many other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional digital signal processors (DSPs), or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such DSPs, or generating such ICs with minimal experimentation. Therefore, in the interest of brevity and minimization of any risk of obscuring the principles and concepts according to the present invention, further discussion of such DSPs and ICs, if any, will be limited to the essentials with respect to the principles and concepts employed by the preferred embodiments.

Referring to FIG. 1, a diagram 100 depicts a prior-art technique for buffering channel metrics in a system employing interleaving but no other forms of diversity. Thus the receiver must only perform deinterleaving. First, the M channel metrics are written as they are received into an intermediate metrics buffer 102. Once they have all been collected, a deinterleaving procedure is performed, and they are written into a final metrics buffer 104. The RAM requirement in this case is 2M locations, twice the size of the final metrics buffer 104.

FIG. 2 is a diagram 200 depicting a prior-art technique for buffering channel metrics in a system employing only Nth-order repeat diversity. Note that the term "repeat diversity" here encompasses many types, such as frequency hopping with the symbol repeated on two or more hops, explicit frequency diversity where the symbol is transmitted simultaneously on two or more frequencies, and antenna diversity where uncorrelated versions of the symbol are received on two or more antennas. Assume that the diversity combining is additive. The channel metrics from each diversity branch are stored in N intermediate metrics buffers 202, 204, 206, and after the M metrics from all N branches have been received, they are combined and written to the final metrics buffer 208. The RAM requirement is M(N+1) locations, or (N+1) times greater than the size of the final metrics buffer 208.

FIG. 3 is an exemplary diagram 300 depicting a technique for buffering channel metrics in accordance with the present invention in a system employing at least one of interleaving and repeat diversity. When only interleaving is used, a more efficient way of doing the deinterleaving is to perform it as the channel metrics are received. A simple calculation of the appropriate index into the final metrics buffer is performed 302 during each symbol interval, and the channel metric is written 304 into the location pointed to by that index. Thus the RAM requirement is just M locations, the size of the final metrics buffer 306. An example of the index calculation follows.

Consider a block interleaver with r rows and c columns. At the transmitter, the symbols x(0), x(1), ... x(rc−1) are to be interleaved. The symbols are read into the block interleaver by columns and read out by rows, to give the interleaved stream x(0), x(r), x(2r), ... x((c−1)r), x(1), x(r+1), ... x((c−1)r+1), x(2), x(r+2), ... x(rc−1).

If the channel symbols are defined as y(0), y(1), y(2), ... y(rc−1), the channel index refers to the y(i). We need a formula to compute the index into the final metrics buffer as a function of the channel index. That formula is $$i_{BUFFER} = r \bmod(i_{CHANNEL}, c) + \left\lfloor \frac{i_{CHANNEL}}{c} \right\rfloor$$

For $i_{CHANNEL}$=0, 1, 2, ..., (rc−1), we get $i_{BUFFER}$=0, r, 2r, ... (c−1)r, 1, r+1, 2r+1, ... (c−1)r+1,2, r+2, ... (rc−1).

When repeat diversity is used, a more efficient way of doing the additive combining is to keep a running sum of the final metrics as the channel metrics are received. The final metrics buffer 306 is initialized to zeros or some predetermined value. Each time a channel metric is received, its location in the final metrics buffer 306 is determined. The existing value of the metric or combination of metrics is read from the final metrics buffer 306, the channel metric is combined with or added to it, and the result is written back to the final metrics buffer 306. Thus the RAM requirement is just M locations, the size of the final metrics buffer 306, which, advantageously, is a savings of N times the size of the final metrics buffer 306 in comparison to the prior-art technique.

FIG. 4 is an exemplary diagram 400 depicting transmitter interleaving and frequency diversity 402, and receiver deinterleaving and diversity combining 404, in accordance with the present invention. In this example, there are one-hundred symbols 406, which are repeated 410 on two hops, totaling two-hundred symbols 414 sent interleaved 416 over the two hops 418, 420, or one-hundred symbols per hop. Associated with each channel symbol are, for example, the outputs of eight matched filters, which are represented by eight bits each. Thus each channel metric requires four 16-bit words of RAM. If stored in the prior-art manner, there would need to be 200*4=800 words of intermediate RAM, along with 100*4=400 words of RAM for the final metrics, for a total of twelve-hundred words of RAM used in the receiver.

Applying the efficient technique in accordance with the present invention would require only the final metrics buffer 424, with four-hundred words of RAM in blocks of four words located by one-hundred indexes, a savings of 67% over the twelve-hundred words required in the prior-art method. The final metrics buffer 424 is first initialized to zeros. When the channel metric for a symbol is received, the appropriate index into the buffer is calculated, which takes into account both the time interleaving and the repeat diversity. When all metrics for a complete frame of data have been finalized and written into the final metrics buffer 424, the deinterleaved and combined frame of data metrics is then passed to the demodulator and decoder 426 for further processing to produce the recovered one-hundred symbols 428. It will be appreciated that, in some alternative embodiments, different portions of the frame of data are sent on different diversity branches, and further that the time interleaving technique can differ as well on different diversity branches, thereby necessitating knowledge of the diversity branch on which the channel metric is received in order to compute the index into the final metrics buffer 424.

FIG. 5 is an exemplary flow diagram 500 depicting a technique for deinterleaving and diversity combining in accordance with the present invention. The flow begins with a processor 604 (FIG. 6) determining 502 a channel metric from a received data signal. It will be appreciated that the channel metric preferably corresponds to a symbol transmitted during a symbol period. It will be further appreciated that, in some alternative embodiments, the processor 604 can determine multiple channel metrics during each symbol period. Next, the processor 604 calculates 504 an index into a final metrics buffer for storing a deinterleaved and combined frame of data metrics, the index determined from a position of the channel metric within an interleaved frame of data. This calculation is possible because both the interleaving process and the diversity-splitting process applied to the received data signal by the transmitter are known, and thus the processor 604 is programmed to calculate the index so as to undo the interleaving process and the diversity splitting process to recover the original data. In one embodiment, the calculation is accomplished by performing a mathematical algorithm. In another embodiment, the calculation is accomplished by performing a table look-up. In yet another embodiment, different portions of the frame of data are sent on different diversity branches, and the index into the final metrics buffer is also determined from the diversity branch on which the channel metric is received.

Next, the processor 604 places 506 a value derived from the channel metric into the final metrics buffer at a location defined by the calculated index. In doing this, the processor 604 preferably reads a running combination, such as a running sum from the final metrics buffer at the index or indexed location, combines the channel metric and the running combination to obtain a new running combination, and then writes the new running combination into the final metrics buffer at the index or indexed location. In one embodiment the running combination is a running sum and the combining includes adding the channel metric to the running sum. The processor 604 then checks 508 whether all metrics for the frame of data being processed have been finalized and written into the final metrics buffer. If not, the flow returns to step 502 to determine the next channel metric.

If, on the other hand, all metrics for the frame of data being processed have been finalized and written into the final metrics buffer, then the processor 604 reads 510 the deinterleaved and combined frame of data metrics in the final metrics buffer for further processing, moving the data metrics into a demodulation and decoding buffer, for example. The processor 604 then initializes 512 the final metrics buffer to a predetermined value such as zeros. The processor 604 next checks 514 whether it is time to receive a next interleaved frame of data, and, when it is time, the flow returns to step 502 to begin processing the next frame of data.

FIG. 6 is an exemplary electrical block diagram of a communication receiver 600 in accordance with the present invention. The communication receiver 600 comprises a conventional receiver front end 602. The communication receiver 600 further comprises the processor 604, coupled to the receiver front end 602, for controlling the receiver front end 602. The processor is known and can be one or both of an HC11 general purpose microprocessor and a 56000 DSP available from Motorola, Inc. The processor 604 further comprises a memory 608 for storing operating variables and software for programming the processor 604. The communication receiver 600 preferably also includes a conventional user interface 606, e.g., items such as a keypad, a display, a loudspeaker, and a microphone, for interfacing with a user.

Figure 7:
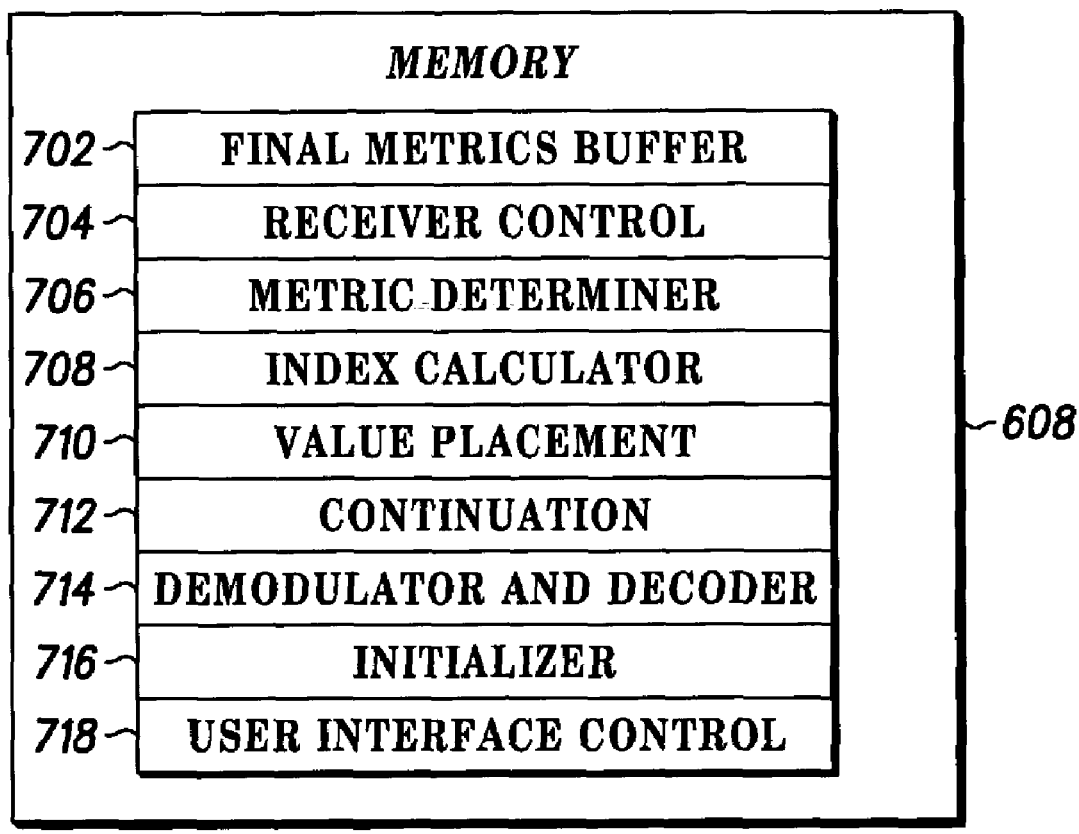
FIG. 7 is an exemplary diagram depicting operating variables and software elements stored in a memory for programming a processor of the communication receiver in accordance with the present invention.

FIG. 7 is an exemplary diagram depicting the operating variables and software elements stored in the memory 608 for programming the processor 604 in accordance with the present invention. The memory 608 comprises a final metrics buffer 702 for storing the deinterleaved and combined frame of data metrics. The memory 608 further comprises a receiver control program 704 for programming the processor to cooperate with the receiver front end 602 to receive the data signal on a diversity branch. The memory 608 further comprises a metric determiner 706 for programming the processor to cooperate with the receiver front end 602 to determine a channel metric from the data signal through well-known techniques. The memory 608 also includes an index calculator 708 for programming the processor 604 to calculate an index into the final metrics buffer 702 as disclosed herein above. In addition, the memory 608 includes a value placement element 710 for programming the processor 604 to place a value derived from the channel metric, as disclosed herein above, into the final metrics buffer 702 at a location defined by the index. The memory 608 further comprises a continuation element 712 for programming the processor 604 to continue to cooperate with the receiver front end 602 to receive the data signal, determine the channel metric, calculate the index, and place the value, until all values for the interleaved frame of data have been finalized and written into the final metrics buffer 702, thereby producing the deinterleaved and combined frame of data metrics. The memory 608 further comprises a conventional demodulator and decoder 714 for programming the processor 604 to read the deinterleaved and combined frame of data metrics in the final metrics buffer 702 for further processing to recover the data symbols, through well-known techniques. In addition, the memory 608 includes an initializer 716 for programming the processor 604 to initialize the final metrics buffer 702 to a predetermined value, such as zeros, before starting to receive a next interleaved frame of data. The memory 608 further comprises a conventional user interface control 718 for programming the processor to interact with the user interface 606 through well-known techniques.

Thus, it should be clear from the preceding disclosure that the present invention provides a method and apparatus for facilitating an efficient deinterleaving and diversity-combining of a data signal. The method and apparatus advantageously substantially reduces the memory resources required to perform deinterleaving and combining.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method for facilitating an efficient deinterleaving and diversity-combining of a data signal received on a diversity branch in a communication system employing interleaving and repeat diversity, the method comprising:
    determining a channel metric from the data signal;
    calculating an index into a final metrics buffer for storing a deinterleaved and combined frame of data metrics, the index determined from a position of the channel metric within an interleaved frame of data; and
    placing a value derived from the channel metric into the final metrics buffer at a location defined by the index, performed by:
        reading a running combination from the final metrics buffer at the location defined by the index;
        combining the channel metric and the running combination to obtain a new running combination; and
        writing the new running combination into the final metrics buffer at the location defined by the index.

2. The method of claim 1, further comprising, after all channel metrics for the interleaved frame of data have been finalized and written into the final metrics buffer:
    reading the deinterleaved and combined frame of data metrics in the final metrics buffer for further processing; and
    initializing the final metrics buffer to zeros before starting to receive a next interleaved flame of data.

3. The method of claim 1, wherein the calculating the index comprises performing a table look-up.

4. The method of claim 1,
    wherein the data signal comprises a plurality of symbols, each symbol transmitted during a symbol period, and
    wherein the determining the channel metric comprises determining multiple channel metrics during the symbol period.

5. The method of claim 1, wherein the calculating the index comprises determining the index from the diversity branch on which the data signal is received.

6. An apparatus for facilitating an efficient deinterleaving and diversity-combining of a data signal received on a diversity branch in a communication system employing interleaving and repeat diversity, the apparatus comprising:
    a processor comprising a final metrics buffer for storing a deinterleaved and combined frame of data metrics, the processor coupled to the data signal and programmed to:
        determine a channel metric from the data signal;

calculate an index into the final metrics buffer, the index determined from a position of the channel metric within an interleaved frame of data; and place a value derived from the channel metric into the final metrics buffer at a location defined by the index, wherein the processor is programmed to;

read a running combination from the final metrics buffer at the location defined by the index;

combine the channel metric and the running combination to obtain a new running combination; and write the new running combination into the final metrics buffer at the location defined by the index.

7. The apparatus of claim 6, wherein the processor is further programmed to:

read the deinterleaved and combined frame of data metrics in the final metrics buffer for further processing after all channel metrics for the interleaved frame of data have been finalized and written into the final metrics buffer; and initialize the final metrics buffer to zeros before starting to receive a next interleaved frame of data.

8. The apparatus of claim 6, wherein the processor is further programmed to perform a table look-up to calculate the index.

9. The apparatus of claim 6, wherein the data signal comprises a plurality of symbols, each symbol transmitted during a symbol period, and wherein the processor is further programmed to determine multiple channel metrics during the symbol period.

10. The apparatus of claim 6, wherein the processor is further programmed to determine the index from the diversity branch on which the data signal is received.

11. A communication receiver for facilitating an efficient deinterleaving and diversity-combining of a data signal in a communication system employing interleaving and repeat diversity, the communication receiver comprising:

a receiver front end; and a processor, coupled to the receiver front end, comprising a final metrics buffer for storing a deinterleaved and combined frame of data metrics; wherein the processor is programmed to cooperate with the receiver front end to:

receiving the data signal on a diversity branch;

determine a channel metric from the data signal;

calculate an index into the final metrics buffer, the index determined from a position of the channel metric within an interleaved frame of data;

place a value derived from the channel metric into the final metrics buffer at a location defined by the index; and wherein the data signal comprises a plurality of symbols, each symbol transmitted during a symbol period; and wherein the processor is further programmed to determine multiple channel metrics during the symbol period.

12. The communication receiver of claim 11, wherein when placing the value, the processor is further programmed to:

read a running sum from the final metrics buffer at the location defined by the index;

add the channel metric to the running sum to obtain a new running sum; and write the new running sum into the final metrics buffer at the location defined by the index.

13. The communication receiver of claim 11, wherein the processor is further programmed to:

read the deinterleaved and combined frame of data metrics in the final metrics buffer for further processing after all channel metrics for the interleaved frame of data have been finalized and written into the final metrics buffer, and initialize the final metrics buffer to zeros before starting to receive a next interleaved frame of data.

14. The communication receiver of claim 11, wherein the processor is further programmed to perform a mathematical algorithm to calculate the index.

15. The communication receiver of claim 11, wherein the processor is further programmed to perform a table look-up to calculate the index.

16. The communication receiver of claim 11, wherein the data signal comprises a plurality of symbols, each symbol transmitted during a symbol period, and wherein the processor is further programmed to determine multiple channel metrics during the symbol period.

* * * * *